United States Patent [19]
Walter et al.

[11] Patent Number: 5,110,835
[45] Date of Patent: May 5, 1992

[54] ANTISTATIC EXPANDABLE STYRENE POLYMERS IN BEAD FORM

[75] Inventors: Manfred Walter, Speyer; Karl-Heinz Wassmer, Limburgerhof; Maria Lorenz, Ludwigshafen, all of Fed. Rep. of Germany

[73] Assignee: BASF Aktiengesellschaft, Ludwigshafen, Fed. Rep. of Germany

[21] Appl. No.: 740,351

[22] Filed: Aug. 5, 1991

[30] Foreign Application Priority Data

Aug. 6, 1990 [DE] Fed. Rep. of Germany ....... 4024871

[51] Int. Cl.$^5$ ............................................. C08J 9/224
[52] U.S. Cl. ......................................... 521/57; 521/86; 521/94
[58] Field of Search ............................... 521/57, 86, 94

[56] References Cited

U.S. PATENT DOCUMENTS

| | | | |
|---|---|---|---|
| 3,661,810 | 5/1972 | Gahrnig | 521/57 |
| 4,302,549 | 11/1981 | Crowley | 521/57 |
| 4,438,058 | 3/1984 | Tanaka | 521/57 |
| 4,556,680 | 12/1985 | Braemer | 521/57 |
| 4,603,149 | 7/1986 | Kesling, Jr. et al. | 521/57 |
| 4,622,345 | 11/1986 | Kesling, Jr. et al. | 521/57 |
| 4,628,068 | 12/1986 | Kesling, Jr. et al. | 521/57 |
| 4,781,983 | 11/1988 | Stickley | 521/57 |
| 4,808,448 | 2/1984 | Cox | 521/57 |

*Primary Examiner*—Morton Foelak
*Attorney, Agent, or Firm*—Keil & Weinkauf

[57] ABSTRACT

An antistatic expandable styrene polymer in bead form, containing
a) a styrene polymer,
b) from 0.5 to 3% by weight, based on a), of a coating containing
  b1) from 10 to 70% by weight of finely divided silica;
  b2) from 20 to 80% by weight of a hydroxy-containing quaternary ammonium salt
  and, if desired, p1  b3) from 0.05 to 20% by weight of a conventional coupling agent and/or
c) from 1 to 8% by weight, based on a), of a $C_3$ to $C_6$ hydrocarbon as blowing agent, and, if desired,
d) conventional additives in effective amounts.

1 Claim, No Drawings

ANTISTATIC EXPANDABLE STYRENE POLYMERS IN BEAD FORM

The present invention relates to antistatic expandable styrene polymers in bead form which have good flow properties.

It is known to provide expandable styrene polymers with an antistatic finish by means of quaternary ammonium salts. According to the examples of U.S. Pat. No. 4,603,149 and U.S. Pat. No. 4,628,068, the coating is produced by treating the polymer with a less than 1% strength solution of the ammonium salt in pentane and then subsequently evaporating the solvent. The process is very complex and gives products of unsatisfactory flow properties.

Attempts to apply the ammonium salt to the beads without using a solvent did not give uniform coating of the surface and the products obtained had poor flow properties.

It is an object of the present invention to develop a process in which the use of solvents for the coating can be avoided and which gives products of good flow properties and in which the processing properties are not adversely affected.

We have found that, surprisingly, these objects are achieved by coating the expandable styrene polymers in bead form with a mixture of a quaternary ammonium salt and finely divided silica.

The invention accordingly provides an antistatic expandable styrene polymer in bead form, containing
  a) a styrene polymer,
  b) from 0.5 to 3% by weight, based on a), of a coating containing
    b1) from 10 to 70% by weight of finely divided silica,
    b2) from 20 to 80% by weight of a hydroxyl-containing quaternary ammonium salt
    and, if desired,
    b3) from 0.05 to 20% by weight of a conventional coupling agent and/or
    b4) from 10 to 30% by weight of a conventional agent for shortening the cooling time,
  c) from 1 to 8% by weight, based on a), of a $C_3$- to $C_6$-hydrocarbon as blowing agent,
and, if desired,
  d) conventional additives in effective amounts.

The principal component a) in the novel products is polystyrene and/or a styrene copolymer containing 50% by weight or more, preferably 80% by weight or more, of copolymerized polystyrene. Examples of suitable comonomers are α-methylstyrene, ring-halogenated styrenes, ring-alkylated styrenes, acrylonitrile, esters of acrylic or methacrylic acid with alcohols having from 1 to 8 carbon atoms, N-vinylcarbazole and maleic acid (anhydride). The polystyrene may advantageously contain a small amount of a copolymerized chain-branching agent, i.e. a compound containing more than one, preferably two, double bonds, such as divinylbenzene, butadiene or butanediol diacrylate. The branching agent is generally used in an amount of from 0.005 to 0.05 mol-%, based on styrene.

The styrene polymers advantageously used have molecular weights and molecular weight distributions as described in EP-B 106 129 and DE-A 39 21 148.

It is also possible to use mixtures of different styrene polymers, as described, for example, in DE-A 39 01 329, 39 08 238, 39 36 596, 39 31 862 and 39 16 602.

The component b) in the novel products which is essential to the invention is from 0.5 to 3.0% by weight, preferably from 0.7 to 2.5% by weight, in particular from 1.0 to 2.0% by weight, of a coating containing
  b1) from 10 to 70% by weight, preferably from 20 to 60% by weight, in particular from 25 to 50% by weight, of finely divided silica,
  b2) from 20 to 80% by weight, preferably from 30 to 70% by weight, in particular from 40 to 60% by weight, of a hydroxyl-containing quaternary ammonium salt, and, if desired,
  b3) from 0.05 to 20% by weight, preferably from 1 to 10% by weight, of a conventional coupling agent and/or
  b4) from 10 to 30% by weight, preferably from 15 to 25% by weight, of a conventional agent for shortening the cooling time.

The finely divided silica b1) is a commercial product, generally having a mean particle size of from 10 to 300 μm, in particular from 30 to 150 μm. The DIN 66 131 surface area is generally from 100 to 1000 $m^2/g$.

Suitable ammonium salts b2) contain from 1 to 3 hydroxyl-containing organic radicals on the nitrogen in addition to alkyl groups.

Examples of suitable quaternary ammonium salts are those which contain from 1 to 3, preferably 2, identical or different alkyl radicals having from 1 to 12, preferably from 1 to 10, carbon atoms and from 1 to 3, preferably 2, identical or different hydroxy- or hydroxyalkylpolyoxyalkylene radicals bonded to the nitrogen cation, with any desired anion, such as chloride, bromide, acetate, methylsulfate or p-toluenesulfonate.

The hydroxy- and hydroxyalkylpolyoxyalkylene radicals are those produced by oxyalkylation of a nitrogen-bonded hydrogen atom and are derived from 1 to 10 oxyalkylene radicals, in particular oxyethylene and oxypropylene radicals.

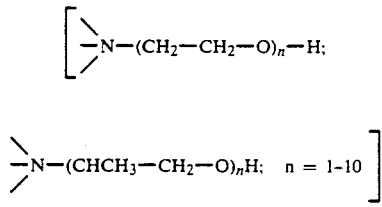

Preference is given to bis(2-hydroxyethyl)octylmethylammonium p-toluenesulfonate, bis(2-hydroxypropyl)-dioctylammonium chloride, tris(2-hydroxyethyl)methylammonium acetate and the ammonium salt obtained by reacting ammonia with 15 mol of ethylene oxide and subsequently quaternizing the product using dimethyl sulfate.

In order to ensure good and uniform adhesion of the coating to the polymer beads, b3) a conventional coupling agent, for example an aqueous dispersion of polyvinyl acetate, polyvinyl propionate, polyethyl acrylate, polybutyl acrylate or a styrene-butadiene copolymer, may be used.

In order to reduce the cooling time (minimum mold residence time) in the production of foam moldings, b4) a conventional agent for shortening the cooling time, for example a glycerol ester of a long-chain carboxylic acid, such as glycerolmonostearate, or an ester of citric acid with a long-chain alcohol, such as tristearyl citrate, may be used.

Component c), as a conventional blowing agent, in the expandable styrene polymers is from 0.5 to 8% by weight, preferably from 1 to 6% by weight, based on a), of a $C_3$- to $C_6$-hydrocarbon, such as propane, n-butane, isobutane, n-pentane, isopentane, neopentane and/or hexane, preferably a commercially available pentane isomer mixture.

The expandable styrene polymers may contain, as component d), conventional assistants, such as dyes, pigments, fillers, stabilizers, flameproofing agents, synergists, nucleating agents, lubricants and the like in conventional effective amounts.

In order to differentiate in practice styrene polymers with an antistatic finish from those without, a conventional fluorescent dye which absorbs in the UV range is preferably added, generally in an amount of from 1 to 100 ppm, preferably from 2 to 50 ppm, in particular from 5 to 20 ppm. Examples of suitable fluorescent brighteners are Ultraphor SF-PO [bis(cyanostyryl)benzene, BASF AG], Lumogen F Violet 570 [4,5-dimethoxy-N-2-ethylhexyl-1-naphthylimide, BASF AG], Uvitex OB [2,2'-(2,5-thiophenediyl)bis(5-(1,1-dimethyl)benzoxazole), Ciba Geigy GmbH] and Uvitex FP [4,4'-bis(2-methoxystyryl)-biphenyl), Ciba Geigy GmbH].

Other suitable additives are poly(2,6-dimethyl)-1,4-phenylene ether and poly-1,4-phenylene sulfide (cf. DE-A-39 04 370 and DE-A-39 24 868). These additives increase the heat distortion resistance of foam. Other suitable additives are styrene-soluble elastomers (cf. DE-A-39 15 602), which increase the resilience of foam.

The expandable styrene polymers are generally in the form of particles, in particular in the form of beads, advantageously having a mean diameter of from 0.05 to 6 mm, in particular from 0.4 to 3 mm. They are prepared in a conventional manner by suspension polymerization, in which a styrene is polymerized in aqueous suspension in the presence of a conventional suspension stabilizer by means of catalysts which form free radicals, with or without addition of further comonomers. A regulator and/or a chain-branching agent are advantageously added, for example in an amount of from 0.005 to 0.05 mol-%. The blowing agent and, if used, the additives may be added before, during or after the polymerization.

When the polymerization is complete, the resultant expandable styrene polymer beads are separated off from the aqueous phase, washed, dried, screened and subsequently coated with component b). The coating may take place in a conventional drum mixer.

To produce foams, the expandable styrene polymers are expanded in a conventional manner by heating to a temperature above their softening point, for example using hot air or preferably using steam. After cooling and if desired after interim storage, the foam particles obtained can be expanded further by re-heating, and may subsequently be welded in a conventional manner to give moldings in molds which do not close in a gas-tight manner.

The foams obtained generally have a density of from about 0.01 to 0.1 g/cm$^3$, and are used, inter alia, as thermal insulators, soundproofing materials, cushioning materials and for impact-absorbent packaging. The foams have a greatly reduced tendency toward electrostatic charging.

In the examples, parts are by weight.

EXAMPLES

A mixture of 150 parts of water, 0.1 part of sodium pyrophosphate, 100 parts of styrene, 0.15 part of benzoyl peroxide and 0.25 part of tert-butyl perbenzoate was heated for 2 hours at 90° C. with stirring in a pressure-tight reactor. After 1 hour, 4 parts of a 10% strength aqueous solution of polyvinylpyrrolidone were added as suspension stabilizer, and the mixture was then stirred for a further 2 hours at 90° C., then for 2 hours at 100° C. and finally for 2 hours at 120° C. After 5 hours from commencement of the polymerization, 7 parts of pentane were added.

After the mixture had been cooled to room temperature, the bead polymer obtained (mean particle diameter 1.0 mm) was separated off, washed, freed from adherent surface water by flash drying and subsequently screened.

The expandable polymer beads from the screen fraction 0.7 to 1 mm were subsequently coated with the amounts of coating agents given in the Table by tumbling in a paddle mixer (Lödige type) for 3 minutes.

Coating agent A (according to the invention) was an intimate mixture of 275 parts of bis(2-hydroxyethyl)-octylmethylammonium p-toluenesulfonate (90% strength in water, Chemstat 106G from Chemax), 100 parts of polyvinyl propionate (50% strength aqueous dispersion, Propiofan 6D from BASF AG), 150 parts of finely divided precipitated silica (Sipernat 50 from Degussa AG), 75 parts of tristearyl citrate (as lubricant) and 0.3 part of biscyanostyrylbenzene (Ultraphor SF-PO from BASF AG) as UV dye.

Coating agent B (comparison) differs from A through the absence of precipitated silica.

Coating C (comparison) comprises a mixture of glycerol monostearate and zinc stearate (80:20).

In order to determine the flow properties, 1 kg of each of the bead polymers was first stored for 48 hours in a sealed glass vessel. The time taken for the products to run out through a funnel made of smoothed $V_2A$ steel was then measured. The funnel had a tilt angle of 45° and a diameter of 250 mm at the inlet point and 20 mm at the outlet. In order to measure the flow properties, the outlet of the funnel was sealed and 1 kg of the polymers having a bead size of from 0.7 to 1.0 mm was introduced. The outlet was then opened and the time taken for the funnel to empty was noted. The results obtained are shown in the Table.

The adhesion during prefoaming was determined using a metal-framed screen (mesh width: 0.1–0.2 mm) measuring 1000×800×250 mm in a sealed metal housing with steam inlet line and extractor. The steam at 100° C. flowed into the prefoaming apparatus from below, passed through the wire mesh containing the product to be tested and was able to escape through the steam extractor. Before commencing the tests, the apparatus was first preheated for about 5 minutes. 500 g of the expandable bead polymers having a particle diameter of from 0.7 to 1.0 mm were then distributed uniformly on the wire mesh, the apparatus was sealed and the steam valve was opened. After 6 minutes, the steam valve was closed again and the metal housing was opened. The bulk density of the prefoamed material was then determined and the adhesion assessed.

The extent of adhesion was classified by the following groups:

0: no adhesion: =             no agglomerates
1: slight adhesion: =         slight agglomeration, but
                              the agglomerates can easily
                              be broken up by gentle
                              tapping with an open hand.
2: moderate adhesion: =       mostly comprising agglomer-
                              ates, but can easily be
                              crumbled by hand
3: considerable adhesion: =   the agglomerates are so
                              stable that manual break-
                              up is only possible with
                              difficulty and with con-
                              siderable deformation of
                              the beads
4: very considerable          the expanded particles are
   adhesion                   fully welded to one
                              another.

In order to determine the minimum molding time (MMT) as a measure of the minimum time required for satisfactory demolding of foam moldings, the foam particles, after interim storage for 24 hours, were welded in a Hofstetter HT 77 automatic molding machine by steam treatment (1.8 bar) to give a molding (200×100×40 mm) having a density of 20 g/l. The MMT is the time, after cooling of the mold, in which the pressure drop in the molding has advanced so far that, on demolding, no bulges or cracks occur in the surface.

The surface resistance $R_s$ of the foam molding was determined in accordance with DIN 53 482 at an atmospheric humidity of 50%. The relaxation time $t_{50}$ is the time after which an electrical charge applied to the surface had dropped to 50%.

The results obtained are shown in the table.

TABLE

| Example | | 1 | 2 (Comparison) | 3 (Comparison) |
|---|---|---|---|---|
| Coating | | A | B | C |
| Coating amount | [%] | 2.0 | 1.4 | 0.5 |
| Flow test | [s/kg] | 17.6 | does not flow | 17 |
| Adhesion | | 0 | 1 | 2 |
| MMT | [s] | 87 | 58 | 78 |
| $R_s$ | [ohm] | $9 \cdot 10^9$ | $5 \cdot 10^{10}$ | $10^{15}$ |
| $t_{50}$ | | 2.7 s | 1.5 s | 12 h |
| Bulk density | [g/l] | 20 | 20 | 20 |

We claim:
1. An antistatic expandable styrene polymer in bead form, containing
   a) a styrene polymer,
   b) from 0.5 to 3% by weight, based on a), of a coating containing
      b1) from 10 to 70% by weight of finely divided silica,
      b2) from 20 to 80% by weight of a hydroxyl-containing quaternary ammonium salt
      and, optionally,
      b3) from 0.05 to 20% by weight of a conventional coupling agent and/or
      b4) from 10 to 30% by weight of a conventional agent for shortening the cooling time,
   c) from 1 to 8% by weight, based on a), of a $C_3$- to $C_6$-hydrocarbon as blowing agent.

* * * * *

UNITED STATES PATENT AND TRADEMARK OFFICE
CERTIFICATE OF CORRECTION

PATENT NO. : 5,110,835
DATED : May 5, 1992
INVENTOR(S) : Walter, et. al.

It is certified that error appears in the above-indentified patent and that said Letters Patent is hereby corrected as shown below:

On the Title page, item [57], Abstract, line 11, Before "C)", insert-- b4) from 10 to 30% by weight of a conventional agent for showing cooling time --.

Signed and Sealed this

Seventeenth Day of August, 1993

Attest:

BRUCE LEHMAN

Attesting Officer

Commissioner of Patents and Trademarks